Aug. 3, 1937.  J. E. SERSTE  2,088,875
HYDRAULIC SHOCK ABSORBER FOR VEHICLES AND OTHER MECHANICAL APPLICATIONS
Filed Aug. 30, 1933  3 Sheets-Sheet 1
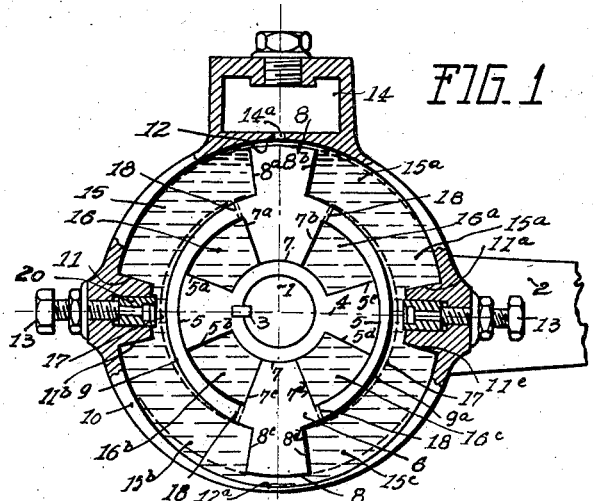
Inventor
JACQUES, EGIDE
SERSTE Aug. 3, 1937.   J. E. SERSTE   2,088,875
HYDRAULIC SHOCK ABSORBER FOR VEHICLES AND OTHER MECHANICAL APPLICATIONS
Filed Aug. 30, 1933   3 Sheets-Sheet 2
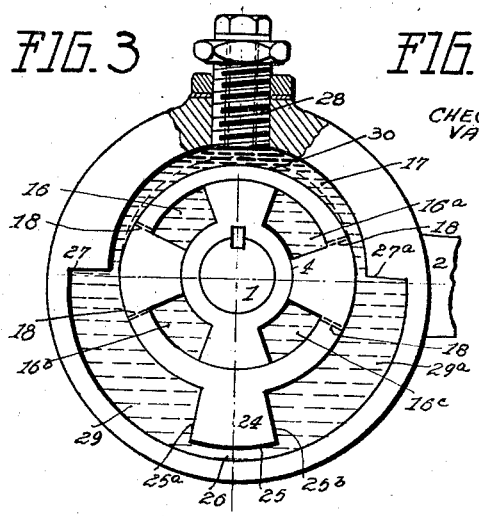
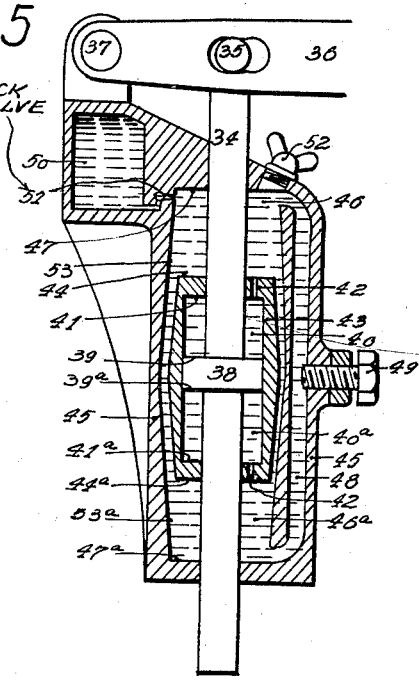
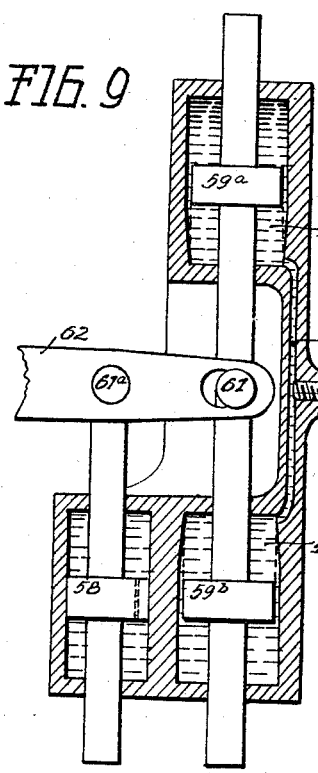
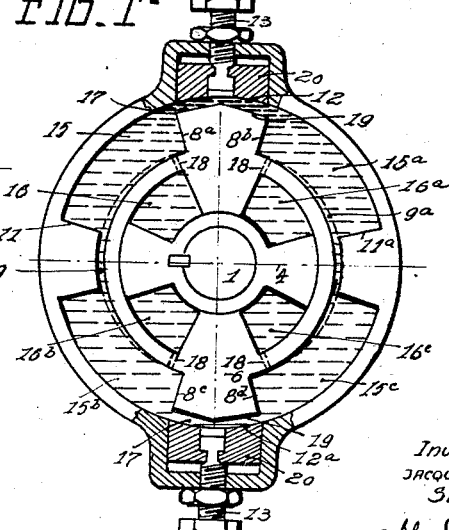
Inventor
JACQUES, EGIDE SERSTE
Attorney.

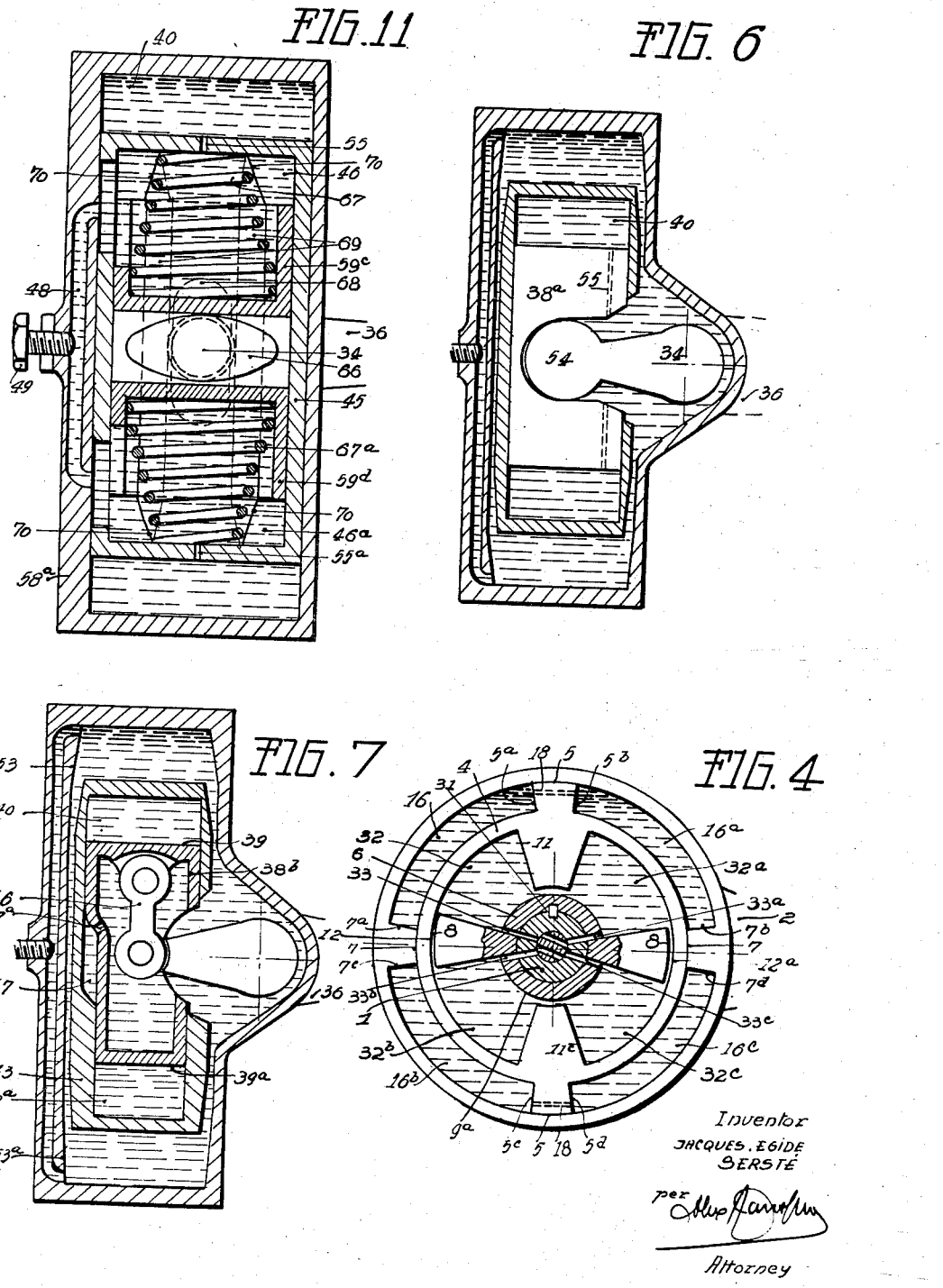

Patented Aug. 3, 1937

2,088,875

UNITED STATES PATENT OFFICE 2,088,875

HYDRAULIC SHOCK ABSORBER FOR VEHICLES AND OTHER MECHANICAL APPLICATIONS

Jacques Egide Serste, Laeken-Brussels, Belgium

Application August 30, 1933, Serial No. 687,467
In Belgium September 13, 1932

6 Claims. (Cl. 188—89)

This invention relates to hydraulic shock absorbers of the kind in which liquid is forced through a restricted opening or throttle by movement of a piston in a cylinder or casing, the movement of the piston being more or less strongly damped by the frictional resistance to fluid flow through the restricted opening or throttle. The invention is more particularly intended to be applied to the spring suspensions of road vehicles for the purpose of damping the spring movements but may be employed in other mechanical applications where a similar damping action is required.

The object of the invention is to provide improvements in the construction and operation of shock absorbers of the kind referred to and in particular to provide an arrangement in which the damping action is relatively slight for small amplitudes but which increases as the amplitude of movement increases.

According to the invention a hydraulic shock absorber of the kind referred to comprises a shock absorbing piston arranged to force liquid through a throttle opening which becomes more restricted as the piston moves away from a normal medial position in combination with an adjusting piston coupled to the first piston so that the movements of the two pistons are added together the movement of the adjusting piston in its cylinder being strongly damped so that the adjusting piston transmits rapid alternating forces substantially without lost motion but is capable of moving in its cylinder or casing in response to a resultant force which persists in one direction.

The means for automatically adjusting the mean position of the piston preferably comprises a second or "adjusting" piston moving in a cylinder or casing and coupled to the first or "shock absorbing" piston in such a manner that the movements of the first and second piston are added together. With this arrangement the adjusting piston provided its movement is strongly damped, will normally have a very small oscillating movement in its cylinder or casing so that the adjusting piston will take little or no part in the control so long as the shock absorbing piston is oscillating about the normal mean position. Should the mean position of the shock absorbing piston be displaced from the normal however, the braking force exerted thereby will be greater during one half cycle of movement than during the other half cycle, and owing to this lack of symmetry the adjusting piston will move automatically to a new position and will thereby adjust the first piston to its normal mean position. In other words the first named member or shock absorbing piston secures a braking action extending from zero in the normal mean position and increasing progressively in proportion as the stroke to be braked increases, so that for instance in a vehicle mounted on suspension springs, little shocks will not cause the shock absorber to intervene and permit said springs to act with full elasticity, whilst said intervention will increase progressively in proportion as the force of the shocks will prolong its action. On the other hand, the second member or adjusting piston will automatically adjust the first member or shock absorbing piston upon each variation of the load of the vehicle or the like and hold the same in its best operative position.

With regard to the manner in which the automatic adjustment of the medial position of the braking piston is effected, it is pointed out that the resistance to displacement of the piston increases as the piston moves further away from its medial position because of the variable throttle opening. Therefore, if the mean position of the piston is displaced the resistance to motion in one direction will be greater than the resistance to motion in the other direction, the resistance to motion in the direction to increase the displacement being the greater. The resistance is thus unbalanced and tends to restore the piston to its correct mean position. It will be understood that the action is a dynamic one and depends on the alternating nature of the movement produced by the riding action of the vehicle springs. The braking piston tends to oscillate about a mean position such that the resistances to displacement on both sides of this mean position are equal, and this feature is present in all the forms of the invention described and illustrated.

In the accompanying drawings, I have illustrated, by way of example, several embodiments of my invention; in these drawings:

Fig. 1 is a vertical section of a first embodiment with rocking pistons or plungers.

Fig. 1a is a similar view showing a modification of said embodiment.

Fig. 2 is a similar view showing another embodiment designed for braking more strongly in one direction than in the opposite direction.

Fig. 3 shows a simplified form of the embodiment illustrated in Fig. 1.

Fig. 4 shows another embodiment with rotary members.

Fig. 5 is a vertical section of a shock absorber with reciprocating plungers.

Figs. 6, 7, 8, 9 and 10 show modifications of the shock absorber illustrated in Fig. 5.

Fig. 11 shows another embodiment of shock absorber with reciprocating plungers.

Referring to Fig. 1, 1 is the axle rigidly connected to the lever 2 and carrying the adjusting piston or plunger 4, secured to it by means of the key 3 and comprising two wings defined by the surfaces 5a to 5d and 5. The surfaces 5 are in close contact with the annular portion of a braking piston or plunger 6, comprising two groups of wings, one of which acting towards the center is defined by the surfaces 7a to 7d and 7, and remains in close contact at 7 with an annular portion of the piston 4, whilst the other, defined by the surfaces 8a to 8d, is external and ends at the concentric surfaces 8. A casing 10 provided with two fixed stops having abutment surfaces 11—11c is provided to contain the whole of the parts described, a slidably mounted throttle element 20 being arranged in each of the fixed stops and adjusted by means of screws 13. The inner surfaces 12 and 12a of the casing, which cooperate with the surfaces 8 of the piston 6 and the outer surfaces 9 and 9a of the piston 6 which cooperate with the fixed stops, are of eccentric form so that the space between these respective surfaces varies as the piston is moved. Except the axle 1 extending through the casing and the lever 2 operating at the exterior, the whole of the members are closely retained by side walls, one of which forms the bottom of the casing, whilst the other constitutes the removable cover thereof. Thus said tightly closing walls constitute the cells 15 to 15c and 16 to 16c, which together with the channels 17 between the piston 6 and the fixed stops, the channels 18 which are formed in the braking piston and connect the cells 15 to 15c to the cells 16 to 16c respectively and the reservoir 14 which is mounted externally of the casing and is connected to the cells 15 and 15a by a duct 14a form the containers for braking liquid.

In the modification illustrated in Fig. 1a, the adjustable throttle elements 20 are mounted in recesses in the casing instead of in the fixed stops and are arranged to cooperate with the outer wings of the braking piston 6, the outer surfaces 19 of which are formed of two angularly disposed plane surfaces.

The embodiment illustrated in Fig. 2 is distinguished from the embodiment illustrated in Fig. 1 in that the cells 23, 23c and 23a, 23b constitute two groups of different sizes. This arrangement brings with it the formation of two small chambers 21, communicating through channels 22 with the circulating liquid.

The shock absorber illustrated in Fig. 3 differs from those above described in that it has a braking piston with a single wing 24 defined by surfaces 25a—25b and 25 and a single eccentric portion 30 arranged diametrically opposite the wing 24 and cooperating with an adjustable throttle element 28, two fixed abutments 27, 27a on the casing which together with the surfaces 25a, 25b enclose two cells 29—29a and a single eccentric portion on the casing which cooperates with the wing 24.

The shock absorber illustrated in Fig. 4 may be considered as a reverse arrangement with relation to the shock absorber illustrated in Fig. 1, that is, whilst in the latter the braking piston is arranged externally of the automatic adjusting piston, the reverse is produced in the shock absorber illustrated in Fig. 4. Instead of external adjusting screws 13, I have provided a simple rotary slide valve 31, extending through the center of the axle 1 in order to connect the cells 32, 32a and 32b, 32c together. Other members of this shock absorber are also interchanged as hereinafter described.

All the eccentric parts shown in Figs. 1 to 4 may be replaced by concentric surfaces with eccentric grooves.

Whilst in the shock absorbers so far described, rocking movements are imparted to the members or pistons, these members are designed in the shock absorbers illustrated in Figs. 5 to 11 for rectilinear movements.

It will be easily understood that the same principle is involved in all the shock absorbers described and illustrated.

In the shock absorber illustrated in Figure 5, a piston rod 34, connected at 35 to a lever 36 pivoted at 37, carries a plunger 38 forming the adjusting piston defined by two surfaces 39 and 39a and operating within a cylinder 40, the inner plane surfaces 41 and 41a of which are provided with channels 42. The outer portions of the cylinder 40 constituting the braking piston 43 are defined by two surfaces 44 and 44a and the piston is movable within a cylinder or housing 45 of double frusto-conical form closed at its ends by two surfaces 47 and 47a. A channel 48 connecting the chambers 46, 46a is provided with an adjusting screw 49. 50 is a liquid reservoir and 51 a non-return valve. 52 designates a stopper for the discharge of air.

The shock absorber illustrated in Figure 6 differs from that just described in that the lever 36 actuates a finger 54 acting on the adjusting piston 38a. In this modification, the channels 55 are formed in the piston 38a instead of in the cylinder 40.

The shock absorber illustrated in Figure 7 is similar to that shown in Figure 6, except the chambers 40 and 40a being of different sizes and the adjusting piston 38b being operated through the agency of a link 56 the ends of the plunger 43 are of frusto-conical form, the ends 53, 53a of the casing being shaped accordingly. This arrangement provides an auxiliary chamber 57 which is in communication with the circulation liquid through a port 57a.

In all the modifications so far described the two piston and cylinder devices, viz.: the shock absorbing or braking device, and the adjusting device, are arranged in series between the chassis or other body whose movements are to be damped and the axle or other support. Obviously in these arrangements the movement of the shock absorbing piston in its cylinder is transmitted by the adjusting piston.

In the arrangement shown in Fig. 8 the shock absorbing or braking piston 59 and the adjusting piston 58 work in separate cylinders which are rigidly united together and fixed to one of the relatively movable bodies (e. g. a vehicle axle) between which the shock absorbing system is to act. The sliding piston rods 60 and 60a of the pistons 59 and 58 are pivoted by means of pins 61 and 61a respectively to a lever arm 62. This lever arm is pivoted at its end (not shown) remote from 61 and 61a to the chassis or other body whose movements relative to the vehicle axle or other body attached to the piston cylinders is to be controlled. The pivot 61a can be regarded as an adjustable fulcrum for the lever 62 by which the movements of the chassis or other body attached to the end of the lever are transmitted to the piston 59. It will be seen that the movements of the end of the lever 62 (not shown) which is attached to the chassis or other body to be controlled is proportional to the sum of the movements of the pistons 59 and 58. I have provided a movable fulcrum 61a, controlled by the piston 58 so that movement of the piston 58 shifts the mean position of the piston 59.

The shock absorber illustrated in Figure 9 is similar to that shown in Figure 8 except that it has two braking pistons 59a, 59b in separate housings 46, 46a, connected by a passage 63. Also in the arrangement shown in Fig. 9 the arrangement of the cylinders is reversed, that is, the pivotal connection 61a is located intermediate the ends of the lever 62, whilst the pivotal connection 61 is located at one end of the lever 62.

The shock absorber illustrated in Figure 10 is similar to the arrangement shown in Figure 5, except that it has no lever 36, the piston rod 34 being directly connected by a connection at 64 to one of the parts to be braked and another connection at 65 for securing the casing to the other part to be braked. Also in Figure 10, the passage 55 is formed in the piston 38 and connects the spaces 40 and 40a directly together.

The construction shown in Fig. 11 of the drawings comprises a pair of shock absorbing or braking pistons 59c, 59d, working in a common cylinder 45 which itself works in a cylinder 58a and constitutes the adjusting piston.

The pistons 59c and 59d are controlled by springs 67 and 67a which press them into engagement with a double-acting cam 66 fixed to a rock shaft 34 mounted in suitable journals (not shown) carried by the cylinder 45 and suitably packed so as to prevent the escape of liquid through the bearings from the interior of the cylinder 45.

The shaft 34 projects through a slot 68 formed in the cylinder 58a and carries an arm 36 whose free end is connected by a suitable link to one part of the vehicle, for example to a wheel axle, the cylinder 58a being fixed to the vehicle body or other part whose movement vertically to the wheel axle is to be damped.

The whole of the interior of the cylinders 58a and 45 including the space between the pistons 59c and 59d occupied by the cam 66 are filled with oil. The two chambers 46, 46a formed between the pistons 59c and 59d and the ends of the cylinder 45 communicate with one another through grooves 69 cut in the internal walls of the cylinder 45, these grooves being tapered towards their ends in such a way that the flow of oil through the grooves 69 is gradually restricted as either of the pistons 59c and 59d moves from the normal mean position shown in the drawings towards the end of the cylinder 45.

Additional communication between the chambers 46 and 46a is provided by a channel 48 formed in the walls of the cylinder 58a and controlled by a screw 49 which can be adjusted to regulate the flow of oil through the passage 48. The ends of the passage 48 communicate with chambers 46, 46a through slots in the wall of the cylinder 45 and arranged as shown so that communication is maintained in any position to which the cylinder 45 may move. When the pistons move outwards oil from the space in front of the piston passes through the slots or grooves 69 to the area of low pressure behind the pistons, i. e., surrounding the cam. As the grooves taper towards their ends the flow of oil is increasingly restricted as the pistons move further outwards and so brake the movement of the pistons with increasing force.

Each end of the cylinder 45 is formed with a restricted opening 55, 55a so that under the action of a force persisting in one direction, the cylinder 45 moves in the cylinder 58a until it is positioned equally each side of the piston 59c, 59d, oil in front of the cylinder 45 passing to the other side of the said cylinder through the restricted openings 55, 55a. By this means the pistons 59c, 59d always find a medial position in the cylinder 45 whatever the loading of the vehicle.

All the frusto-conical parts of the reciprocating shock absorbers may be replaced by grooves arranged to give a similar effect.

The shock absorbers illustrated in Figures 1 and 3 operate as follows: The rocking movements of the force transmitting member or lever 2 are transmitted by the adjusting piston 4 and chambers 16, 16a, 16b, 16c, to the shock absorbing or braking piston 6, respectively 24.

As the channels 18 owing to their narrowness do not allow an appreciable flow of liquid under the action of rapidly alternating pressures, the members 1, 2, 4 and 6, or 24 may be regarded as a rigid unit so far as the transmission of rapid alternating movements is concerned. As the arm 2 moves under the effect of road shocks, therefore, the wings 8a to 8d respectively 25a and 25b will be displaced alternately towards the stops 11, 11a respectively 27—27a on either side, causing the liquid to circulate between the cells 15 to 15c, respectively 29—29a through the openings formed by the eccentric surfaces 9—9a, respectively 30, and 12—12a respectively 26, and through the adjustable channels 17. Now as the arrangement of the eccentric passages 9—9a, respectively 30 and 12—12a, respectively 26, will reduce the amount of liquid in proportion as the oscillation increases, the braking which is nearly nil at the normal position, will be progressively increased to the complete locking, if required. Moreover by means of the adjusting screws 13, respectively 28, the amount of liquid flowing through the channels 17 may be increased or decreased as desired, whereby the braking action may be decreased or increased according to circumstances.

The slow movements of the arm 2 due to changes in the load on the vehicle will not be transmitted to the pistons 6 or 24 respectively since the channels 18 will permit a flow of liquid sufficient to prevent such transmission. Thus the adjusting piston 4 will move relatively to the shock absorbing or braking pistons 6 or 24 respectively, to compensate for changes in the load on the vehicle and to maintain the shock absorbing pistons 6 or 24 respectively in its correct mean position.

The shock absorber illustrated in Figure 1a operates in the same way.

The shock absorber illustrated in Figure 2 operates in the same way as the shock absorber shown in Figure 1, except that it is designed for braking more strongly in one direction than in the other. To this end the wings of the piston 4 have two sets of surfaces 5a, 5d and 5b, 5c of different sizes, two of which are housed within cells 23a and the other two larger ones within cells 23c. In addition one or more of the eccentric surfaces 9, 9a, 12, 12a or all of them is or are designed so as to increase the throttling effect more rapidly when the shock absorbing piston moves in one direction from its normal mean position than when it moves in the other direction from the normal mean position. It will be found that as a result of these arrangements the braking effect will be stronger in one direction than it is in the other whilst the adjusting piston will still operate to compensate for changes in the load on the vehicle. Channels 22 are provided for connecting the chambers 21 to the circulating liquid, said channels being sufficiently large to enable the liquid to pass freely between the cells 15, 15c and chambers 21.

In the shock absorber illustrated in Figure 4, the shock absorbing or braking piston 6 is keyed to the axle 1 and the adjusting or regulating piston 4 surrounds the piston 6. The piston 4 has wings defined by the surfaces 5, 5a, 5b, 5c, 5d co-operating with abutments defined by the surfaces 7, 7a, 7b, 7c, 7d to form cells 16, 16a, 16b, 16c connected together in pairs by channels 18, all these parts corresponding to the parts indicated by the same references in Figs. 1 and 2.

The piston 6 is provided with wings 8 co-operating with abutments 11 to 11c forming cells 32, 32a, 32b, 32c.

The piston 6 has eccentric surfaces 9a, and the internal walls of the piston 4 have eccentric surfaces, 12, 12a. Channels 33, 33a, 33b, 33c, cut through the piston 6 and shaft 1 are controlled by a plug valve 31 by which the pairs of cells 33, 33a, 33b, 33c can be placed into communication with one another if desired.

While in this shock absorber the members or parts are interchangeable, the operation thereof is similar to that of the preceding shock absorbers.

The reciprocating shock absorber illustrated in Fig. 5 operates as follows: If the lever 36 oscillates the piston rod 34 will move the piston 38 with it, the faces 39 of said piston then alternately compressing in either direction the liquid contained in the cylinder 40 and moving with it, the braking piston 43, which, owing to the conicity at 53 and 53a of the chamber 46, will brake gradually and stronger in proportion as the stroke is continued. Now, as the mean pressures in the chambers 40 and 40a are balanced through the very narrow channels 42, the lever 36 will be brought automatically into its best operative position and held therein, as in the preceding shock absorbers. By means of an adjusting screw 49, I am able to regulate the flow through the passage 48.

The shock absorber illustrated in Figure 6 operates similarly, except that the piston 38a is driven by means of a finger 54, connected to the lever 36 through the axle 34.

The shock absorber illustrated in Figure 7 is designed, like the shock absorber illustrated in Figure 2, so as to produce a stronger braking action in one direction than in the other, at the same time perfectly and automatically balancing the lever 36 in its best operative position. To this end, the shock absorber is provided with a piston 38b, limited at both ends by surfaces 39, 39a of different sizes. In addition the conical part 53 of the cylinder 46 is steeper than the conical part 53a so that the resistance to movement of the piston 43 increases more rapidly as the piston moves towards the part 53 than it does as the piston moves towards the part 53a.

In the shock absorbers illustrated in Figures 8 and 9 the piston 58 also brings the lever 62 to its best operative position, the piston 59 respectively 59a serving as braking member.

In these forms the piston 58 is not moved or moves only very slightly in response to the rapidly alternating forces produced by road shocks. Under the action of a force persisting in one direction due to a change in the load on the vehicle, however, the piston 58 will move so as to adjust the position of the fulcrum 61a in such manner as to compensate for the movement of the body relatively to the wheels due to the change of load.

The shock absorber illustrated in Fig. 10 operates like the shock absorber illustrated in Fig. 5 without intervention of the lever 36.

In the operation of the arrangement shown in Fig. 11, owing to the restricted dimensions of the openings 55, 55a the cylinder 45 cannot move appreciably in response to rapidly alternating forces so that as far as the movements due to road shocks are concerned, the cylinder 45 can be regarded as being fixed in the cylinder 58, the arm 36 is thus rocked by the action of road shocks and imparts movement through the cam 66 to the pistons 59c and 59d, this movement being damped more and more as the arm 36 moves away from the normal medial position shown by the gradual restriction of the oil flow through the slots 69. A change of load on the vehicle produces a force persisting in one direction which tends to move the shaft 34, up or down and the flow of oil through the ports 55, 55a permits the shaft 34, pistons 59c and piston 45 to move bodily up or down in response to such forces so as to compensate for the change of load on the vehicle.

I claim:

1. A hydraulic shock absorber comprising a shock absorbing mechanism consisting of a liquid chamber, a shock absorbing piston working in said chamber, and a throttle opening permitting the flow of liquid in said chamber from one side of said piston to the other and arranged so that the throttle opening becomes more constricted as the said piston moves away from a normal medial position in said chamber, a force transmitting connection for connecting the said shock absorbing mechanism to the part to be controlled, and an adjusting mechanism consisting of a second liquid chamber, an adjusting piston working in said second chamber and a restricted aperture permitting a restricted flow of liquid in said second chamber from one side of the said adjusting piston to the other, said adjusting mechanism being interposed in said force transmitting connection.

2. A hydraulic shock absorber as claimed in claim 1, wherein said adjusting piston works in a cylinder or casing which communicates with the cylinder or casing of the shock absorbing piston through restricted openings in such manner that variations of hydraulic pressure produced by movements of the shock absorbing piston in its cylinder or casing are transmitted through the said restricted openings to the adjusting piston.

3. A hydraulic shock absorber as claimed in claim 1, wherein a shock absorbing piston is mounted to oscillate about an axis of rotation in a cylinder or casing having at least one abutment which co-operates with at least one wing or projection to form at least one pair of cells or chambers, each of said abutments and wings or projections co-operating with concentric surfaces of the piston and cylinder to form throttle openings through which the members of each pair of cells communicate with one another and which are gradually restricted as the piston is rotated further away from a normal mean position.

4. A hydraulic shock absorber as claimed in claim 1, wherein an adjusting piston is mounted to oscillate about an axis of rotation in a cylinder or casing fixed to the shock absorbing piston and provided with at least one abutment co-operating with wings or projections on the adjusting piston to form at least one pair of fluid chambers which communicate with one another through restricted apertures.

5. A hydraulic shock absorber as claimed in claim 1, wherein the second piston is arranged so that the resistance to movement of this piston in its cylinder or casing is greater in one direction than in the other direction whereby the first piston is automatically adjusted to oscillate about a mean position such that the braking action is greater in one direction than in the other direction.

6. A hydraulic shock absorber as claimed in claim 1, wherein the adjusting piston reciprocates in a double ended cylinder which constitutes the shock absorbing piston and which itself reciprocates in a double ended cylinder the two ends of which communicate with one another through openings which are controlled by the shock absorbing piston and are arranged to be restricted when the piston moves from a median position towards either end of its stroke.

JACQUES EGIDE SERSTE.